(12) United States Patent
Salim et al.

(10) Patent No.: US 7,637,031 B2
(45) Date of Patent: Dec. 29, 2009

(54) EVAPORATOR CORE DRYING SYSTEM

(75) Inventors: Munther M. Salim, Macomb, MI (US); Lawrence P. Ziehr, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 112 days.

(21) Appl. No.: 11/768,282

(22) Filed: Jun. 26, 2007

(65) Prior Publication Data
US 2009/0000146 A1    Jan. 1, 2009

(51) Int. Cl.
F26B 19/00    (2006.01)
(52) U.S. Cl. .................. 34/437; 34/90; 62/239; 454/121
(58) Field of Classification Search ............. 34/380, 34/381, 413, 336, 437, 60, 80, 9; 62/239, 62/498; 454/121, 126
See application file for complete search history.

(56) References Cited

U.S. PATENT DOCUMENTS

| | | | | | |
|---|---|---|---|---|---|
| 1,958,225 | A | * | 5/1934 | Askin | 237/9 R |
| 1,986,548 | A | * | 1/1935 | Wolff | 34/139 |
| 2,257,638 | A | * | 9/1941 | Moore | 237/34 |
| 2,559,713 | A | * | 7/1951 | Dunski et al. | 34/421 |
| 2,590,849 | A | * | 4/1952 | Dungler | 34/448 |
| 2,661,603 | A | * | 12/1953 | Trask | 62/176.5 |
| 2,883,161 | A | * | 4/1959 | Boylan et al. | 165/43 |
| 2,893,700 | A | * | 7/1959 | Boylan et al. | 165/272 |
| 2,919,907 | A | * | 1/1960 | Simons | 165/43 |
| 2,950,606 | A | * | 8/1960 | Maddux | 62/320 |
| 3,161,481 | A | * | 12/1964 | Edwards | 34/527 |
| 3,170,509 | A | * | 2/1965 | De Rees et al. | 165/42 |
| 3,273,256 | A | * | 9/1966 | Behrens | 34/546 |
| 3,531,946 | A | * | 10/1970 | Hart | 62/332 |
| 3,759,321 | A | * | 9/1973 | Ares | 165/125 |
| 3,918,271 | A | * | 11/1975 | Whisler | 62/285 |
| 4,062,489 | A | * | 12/1977 | Henderson | 237/1 R |
| 4,216,658 | A | * | 8/1980 | Baker et al. | 62/99 |
| 4,254,636 | A | * | 3/1981 | Zebuhr | 62/325 |
| 4,382,463 | A | * | 5/1983 | Ikebukuro | 165/203 |
| 4,448,035 | A | * | 5/1984 | Moriyama et al. | 62/176.6 |
| 4,519,539 | A | * | 5/1985 | Bussjager et al. | 236/13 |
| 4,794,537 | A | * | 12/1988 | Adasek et al. | 701/36 |
| 4,802,405 | A | * | 2/1989 | Ichitani et al. | 454/75 |
| 4,901,788 | A | * | 2/1990 | Doi | 165/204 |
| 4,940,083 | A | * | 7/1990 | Takenaka et al. | 165/42 |
| 4,970,803 | A | * | 11/1990 | Keller | 34/371 |
| 4,991,405 | A | * | 2/1991 | Sakano | 62/244 |
| 5,033,672 | A | * | 7/1991 | Sakamoto et al. | 236/44 A |
| 5,078,316 | A | * | 1/1992 | Hara et al. | 236/49.3 |
| 5,092,136 | A | * | 3/1992 | Kang | 62/408 |
| 5,105,730 | A | * | 4/1992 | Smith | 454/161 |
| 5,137,491 | A | * | 8/1992 | Ishihara et al. | 454/152 |
| 5,156,204 | A | * | 10/1992 | Doi | 165/204 |
| 5,170,631 | A | * | 12/1992 | Lang et al. | 62/63 |
| 5,181,553 | A | * | 1/1993 | Doi | 165/203 |
| 5,345,778 | A | * | 9/1994 | Roberts | 62/256 |
| 5,353,859 | A | | 10/1994 | Oltahfer et al. | |

(Continued)

*Primary Examiner*—Stephen M. Gravini

(57) ABSTRACT

An evaporator core drying system in which air that is blown by a blower is concentrated into a narrow cross-sectional air stream of high speed purge air which passes progressively across the area of the evaporator core, per an appropriate blow algorithm, so as to effectively and efficiently dry the evaporator core. Preferably, the configurable barrier is composed of at least one roller door located between the blower and the evaporator core.

9 Claims, 5 Drawing Sheets

U.S. PATENT DOCUMENTS

| | | | |
|---|---|---|---|
| 5,357,767 A * | 10/1994 | Roberts | 62/256 |
| 5,361,751 A * | 11/1994 | Biggs | 126/101 |
| 5,450,894 A * | 9/1995 | Inoue et al. | 165/43 |
| 5,553,662 A * | 9/1996 | Longardner et al. | 165/202 |
| 5,816,066 A * | 10/1998 | Aoki et al. | 62/325 |
| 5,906,108 A * | 5/1999 | Kidwell | 62/209 |
| 5,927,391 A * | 7/1999 | Chung | 165/123 |
| 5,939,853 A * | 8/1999 | Masauji et al. | 318/685 |
| 6,002,105 A * | 12/1999 | Tamada | 219/202 |
| 6,038,879 A * | 3/2000 | Turcotte et al. | 62/325 |
| 6,059,016 A * | 5/2000 | Rafalovich et al. | 165/41 |
| 6,321,547 B1 * | 11/2001 | Kidwell | 62/209 |
| 6,332,497 B1 * | 12/2001 | Niwa et al. | 165/204 |
| 6,334,323 B1 * | 1/2002 | Kidwell | 62/209 |
| 6,408,633 B1 * | 6/2002 | Carr | 62/99 |
| 6,427,465 B1 * | 8/2002 | Bednarchik et al. | 62/227 |
| 6,431,257 B1 * | 8/2002 | Sano et al. | 165/42 |
| 6,454,178 B1 * | 9/2002 | Fusco et al. | 236/49.3 |
| 6,527,037 B2 | 3/2003 | Daus et al. | |
| 6,607,433 B2 * | 8/2003 | Vincent | 454/143 |
| 6,609,563 B1 * | 8/2003 | Tsurushima et al. | 165/204 |
| 6,780,097 B2 * | 8/2004 | Shuttleworth et al. | 454/136 |
| 6,789,607 B1 * | 9/2004 | Jun et al. | 165/43 |
| 6,800,022 B2 * | 10/2004 | Urbank et al. | 454/139 |
| 6,814,138 B2 * | 11/2004 | Tsurushima et al. | 165/202 |
| 6,827,141 B2 * | 12/2004 | Smith et al. | 165/202 |
| 6,948,328 B2 * | 9/2005 | Kidwell | 62/209 |
| 6,962,195 B2 * | 11/2005 | Smith et al. | 165/202 |
| 6,964,176 B2 * | 11/2005 | Kidwell | 62/229 |
| 7,010,929 B2 * | 3/2006 | Kidwell | 62/208 |
| 7,036,333 B2 * | 5/2006 | Schurig et al. | 62/279 |
| 7,040,101 B2 * | 5/2006 | Takeda et al. | 62/78 |
| 7,043,926 B2 * | 5/2006 | Smith | 62/89 |
| 7,048,036 B2 * | 5/2006 | Han | 165/43 |
| 7,093,454 B2 * | 8/2006 | Kidwell | 62/209 |
| 7,238,102 B2 * | 7/2007 | Goupil et al. | 454/121 |
| 7,331,188 B2 * | 2/2008 | Quilliard et al. | 62/150 |
| 7,338,357 B2 * | 3/2008 | Voit et al. | 454/158 |
| 7,363,769 B2 * | 4/2008 | Kidwell et al. | 62/260 |
| 7,377,848 B2 * | 5/2008 | Voit et al. | 454/158 |
| 7,448,436 B2 * | 11/2008 | Katoh et al. | 165/61 |
| 7,520,804 B2 * | 4/2009 | Venkatappa et al. | 454/139 |
| 2002/0020185 A1 * | 2/2002 | Carr | 62/310 |
| 2002/0092316 A1 * | 7/2002 | Kidwell | 62/499 |
| 2003/0045224 A1 * | 3/2003 | Vincent | 454/156 |
| 2003/0145616 A1 * | 8/2003 | Kidwell | 62/228.4 |
| 2003/0145621 A1 * | 8/2003 | Kidwell | 62/499 |
| 2003/0217566 A1 * | 11/2003 | Kidwell | 62/499 |
| 2004/0007000 A1 * | 1/2004 | Takeda et al. | 62/78 |
| 2004/0040324 A1 * | 3/2004 | Kidwell | 62/228.4 |
| 2004/0162016 A1 * | 8/2004 | Urbank et al. | 454/75 |
| 2005/0095971 A1 * | 5/2005 | Urbank et al. | 454/75 |
| 2006/0080996 A1 * | 4/2006 | Kidwell | 62/499 |
| 2006/0144582 A1 * | 7/2006 | Sekiya et al. | 165/202 |
| 2007/0012060 A1 * | 1/2007 | Simons | 62/285 |
| 2007/0123159 A1 * | 5/2007 | Venkatappa et al. | 454/139 |
| 2007/0144192 A1 * | 6/2007 | Kidwell | 62/209 |
| 2007/0180848 A1 * | 8/2007 | Lazzarato et al. | 62/408 |
| 2008/0014856 A1 * | 1/2008 | Voit et al. | 454/158 |
| 2008/0029506 A1 * | 2/2008 | Neal | 219/628 |
| 2008/0032619 A1 * | 2/2008 | Voit et al. | 454/158 |
| 2008/0105756 A1 * | 5/2008 | Veettil et al. | 237/81 |
| 2008/0160901 A1 * | 7/2008 | Stanimirovic | 454/239 |
| 2008/0161976 A1 * | 7/2008 | Stanimirovic | 700/276 |
| 2008/0176503 A1 * | 7/2008 | Stanimirovic | 454/229 |
| 2009/0025399 A1 * | 1/2009 | Kamen et al. | 62/6 |

* cited by examiner

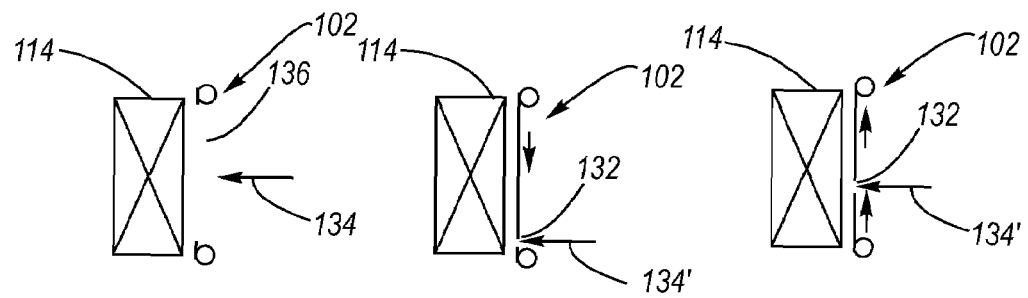
*Fig. 5A*  *Fig. 5B*  *Fig. 5C*
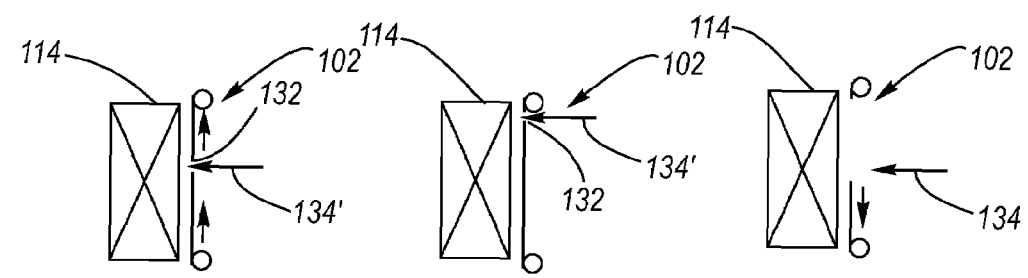
*Fig. 5D*  *Fig. 5E*  *Fig. 5F*
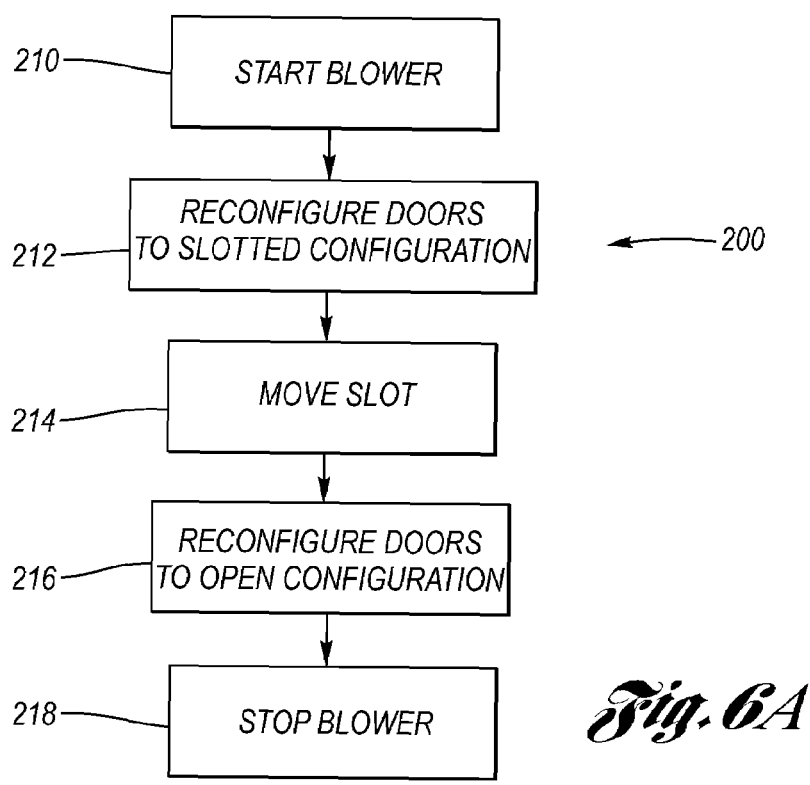
*Fig. 6A*

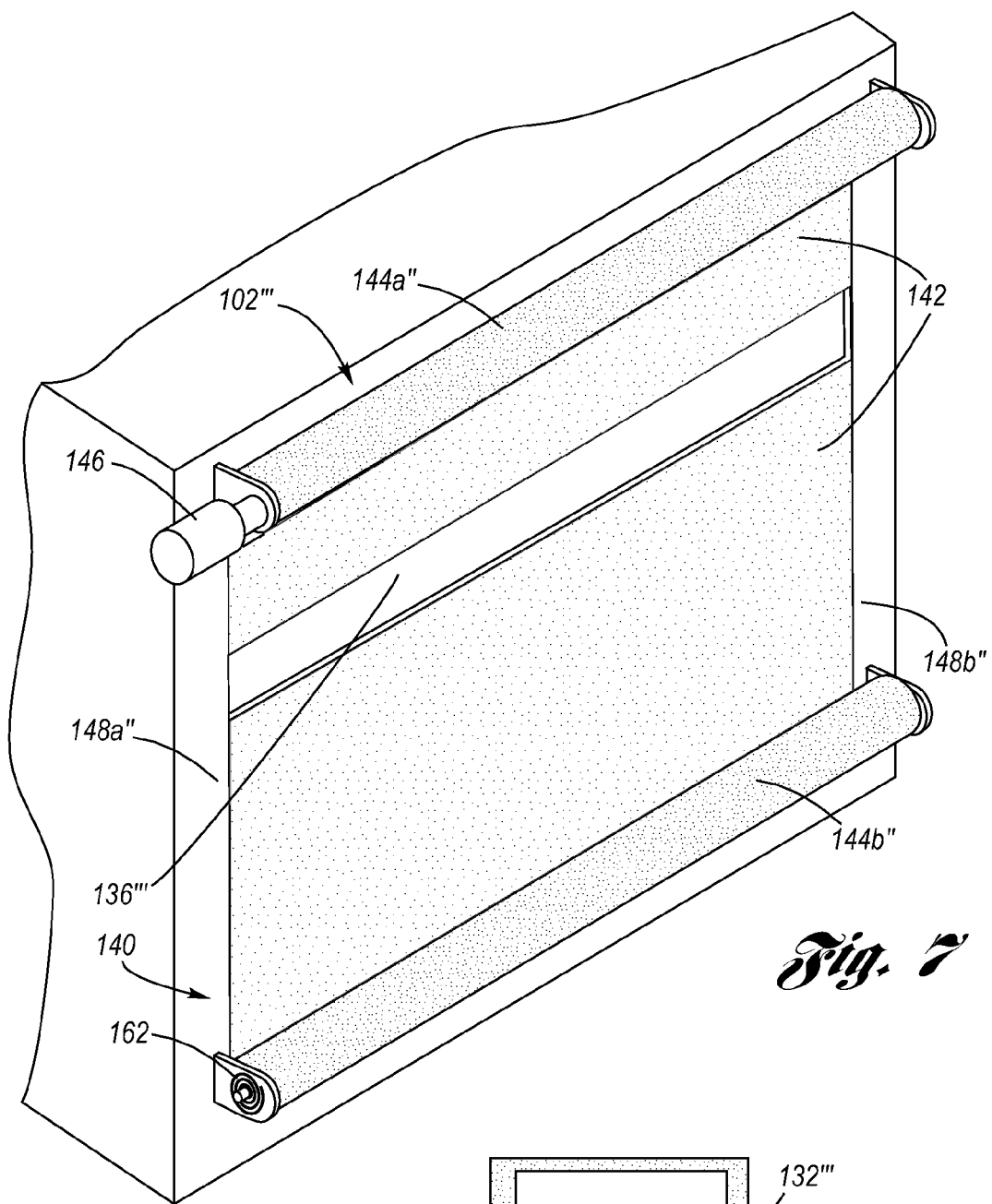
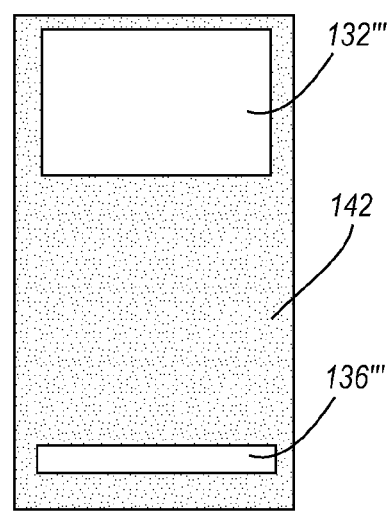

EVAPORATOR CORE DRYING SYSTEM

TECHNICAL FIELD

The present invention relates to heating, ventilation and air conditioning (HVAC) systems, and particularly HVAC systems of motor vehicles. More particularly, the present invention relates to an evaporator core drying system implemented at the termination of operation of the air conditioning component of an HVAC system.

BACKGROUND OF THE INVENTION

The passenger compartment of motor vehicles provides a space which is environmentally adjustable to suit the predilections of the passengers via a heating, ventilation and air conditioning system, hereinafter simply referred to as an HVAC system. In this regard, FIGS. 1 and 2 are schematic depictions of aspects of a conventional HVAC system 10 of a motor vehicle.

As shown at FIG. 1, the HVAC system 10 includes an HVAC module 10a which, in turn, includes a heater core 12 and an evaporator core 14, both of which serving to provide conditioned air to the passenger compartment 16 of the motor vehicle. The heater core 12 conditions the air by heating it as it passes therethrough to the passenger compartment 16 via heated coolant passing therein, wherein the coolant is heated by the internal combustion engine 18, cooled by a radiator 20, and temperature regulated by a thermostat 22. The evaporator core 14 conditions the air by cooling it as it passes therethrough to the passenger compartment 16 via cooled refrigerant passing therein, wherein the refrigerant is compressed by a compressor 24, the heat of compression is rejected to the atmosphere by a radiator 26, and then cooled thereafter by an expansion process. In either case, the temperature of the air entering the passenger compartment is user selectable.

Referring next to FIG. 2, the HVAC module 10a is depicted, the module being defined by an enclosing sidewall 28. Air input is provided thereto, either via a first air-in path 30 which provides air outside the motor vehicle, or a second air-in path 32 which provides air recirculated with respect to the passenger compartment, selection of which of the first and second air-in paths being determined by an air-in door 34. A blower 36 causes air to be drawn in from the first and second air-in paths, and blown air 38 is passed downstream therefrom to the evaporator core 14. A temperature door 40 is positioned to cause the blown air to pass entirely or partly through the heater core 12 or to entirely by-pass it in the event the air conditioning is on maximum. A series of downstream vent doors then direct how the conditioned air passes into the passenger compartment, for example via a floor vent door 42 of a floor vent 42a, and a panel/windshield vent door 44 of a panel vent 44a and a windshield (defroster) vent 44b.

During a typical air conditioning operation of an HVAC system, the evaporator core 14 cools the air which is blown over the evaporator tubes. As the air passes through the evaporator core, it becomes cooler and drier due to loss of moisture content. Usually, the moisture captured from air accumulates on the evaporator core surface and flows down and out via a drain tube 46. However, not all of the accumulated liquid leaves the evaporator core, depending upon the amount of moisture and the environmental conditions, most notably in high temperature and high humidity environments. Water retention at the evaporator core can be problematic, as the accumulated moisture could result in passengers sensing humidity from air entering through the vents, smelling odor due to bacteria and microbial growth, and, from a mechanical point of view, there is potential for rusting of the evaporator core. Accordingly, it is very desirable to ensure this accumulated water at the evaporator core is vacated therefrom whenever the motor vehicle is turned off.

Current HVAC system practices operate the blower intermittently for a short period of time after engine shut-down to remove as much moisture as possible (according to a "blow algorithm" that is well known in the HVAC system art). The blow algorithm directs the blower to blow air across the whole evaporator core surface area at the same time, which means that the air stream speed of the blow air is low and, as a result, could possibly not remove all of the moisture out of the evaporator core before blower shut-down. In addition, the moisture removal rate is limited by the vehicle's battery voltage and is potentially ineffective in humid environments. Accordingly, it is sometimes necessary to use UV light at the evaporator core to get rid of the bacterial growth, the source of which light having attendant packaging, cost and service issues.

Accordingly, what remains needed in the art is an efficient and effective way to ensure removal of moisture from the evaporator cores of HVAC systems.

SUMMARY OF THE INVENTION

The present invention is an evaporator core drying system in which air that is blown by the blower is concentrated into a narrow cross-sectional air stream of high speed purge air which passes progressively across the area of the evaporator core, per an appropriately designed blow algorithm, so as to effectively and efficiently dry the evaporator core.

The evaporator core drying system according to the present invention utilizes a configurable barrier disposed closely adjacent and upstream the evaporator core (downstream of the blower). The configurable barrier is dynamically configurable from a fully open configuration in which the evaporator core is fully exposed to the air blown by the blower, to a slotted configuration in which only a narrow cross-sectional slot exposes the evaporator core to the air blown by the blower, wherein the slot is progressively movable across the area of the evaporator core (as for example progressively from one side to the other; ie., either vertically, horizontally, or diagonally).

In operation of the evaporator core drying system, during utilization of the HVAC system of the motor vehicle, the configurable barrier is in its fully open configuration. However, when the blow algorithm implements, the configurable barrier reconfigures into its slotted configuration, wherein the slot is located at one side of the area of the evaporator core and then moves progressively thereacross to the opposite side. The operation of the blower creates a region of high air pressure between the configurable barrier and the blower, and a region of low air pressure exists downstream of the configurable barrier, wherein these two regions of differing air pressure mutually communicate via the slot. As a consequence of the air pressure drop across the slot, a rapidly moving stream of high speed purge air passes therethrough, the passage of which drying the evaporator core in a progressive manner as the slot progresses across the evaporator core.

According to the preferred embodiment of the evaporator core drying system, the configurable barrier is composed of a roller door system composed of either a selectively actuatable double roller door or a selectively actuatable single roller door.

Accordingly, it is an object of the present invention to provide an evaporator core drying system in which an air stream of high speed purge air passes progressively across the area of the evaporator core so as to effectively and efficiently dry the evaporator core.

This and additional objects, features and advantages of the present invention will become clearer from the following specification of a preferred embodiment.

BRIEF DESCRIPTION OF THE DRAWINGS

FIGS. 5A through 5F are schematic depictions of progressive actuations of the roller doors of FIGS. 4A and 4B in the course of operation of the of the evaporator core drying system according to the present invention.

FIG. 6A is a block diagram of steps of a blow algorithm according to the present invention.

FIG. 7 is a perspective view of a second preferred type of configurable barrier of the evaporator core drying system according to the present invention having a single actuatable roller door.

FIG. 7A is a plan view of a planar member of the folding door of FIG. 7.

DESCRIPTION OF THE PREFERRED EMBODIMENT

Figure 1:
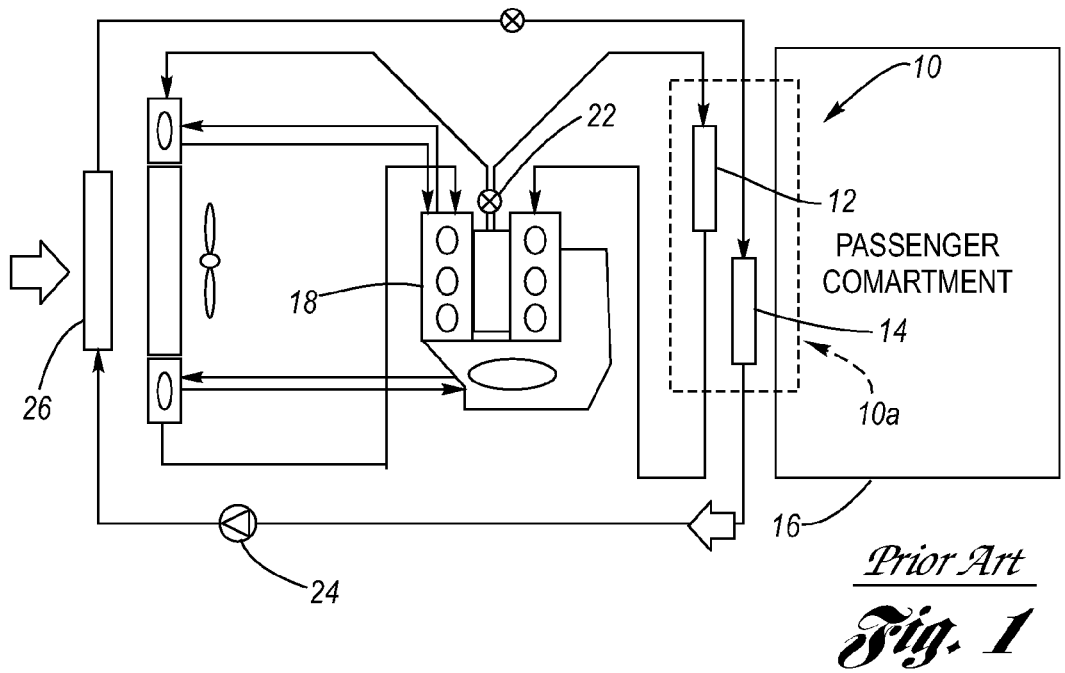
FIG. 1 is a schematic diagram of a motor vehicle HVAC system environment of operation according to the prior art.

Referring now to the Drawing, FIGS. 3A through 7A depict various views of details of implementation of the evaporator core drying system according to the present invention.

Figure 3A:
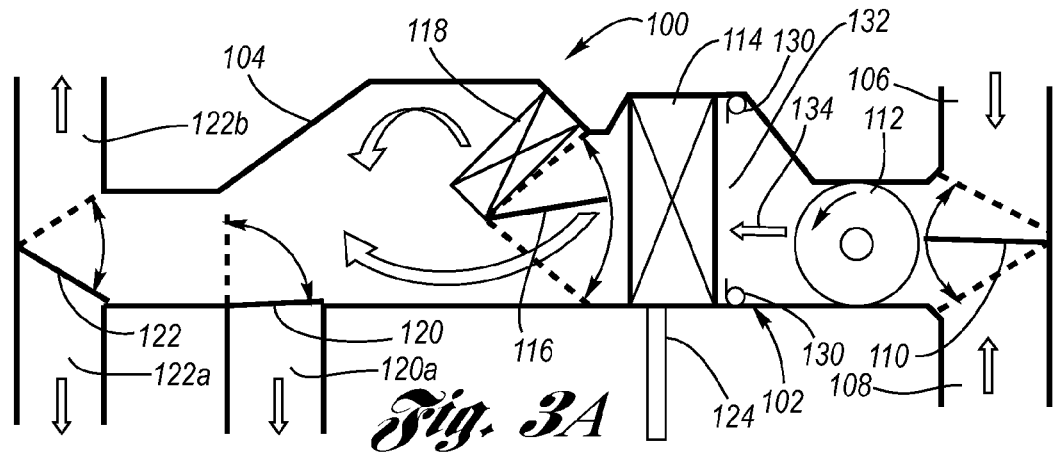
FIG. 3A is a schematic diagram of a motor vehicle HVAC system module, including an evaporator core drying system according to the present invention, wherein the configurable barrier of the evaporator core drying system is at its fully open configuration.
Figure 3B:
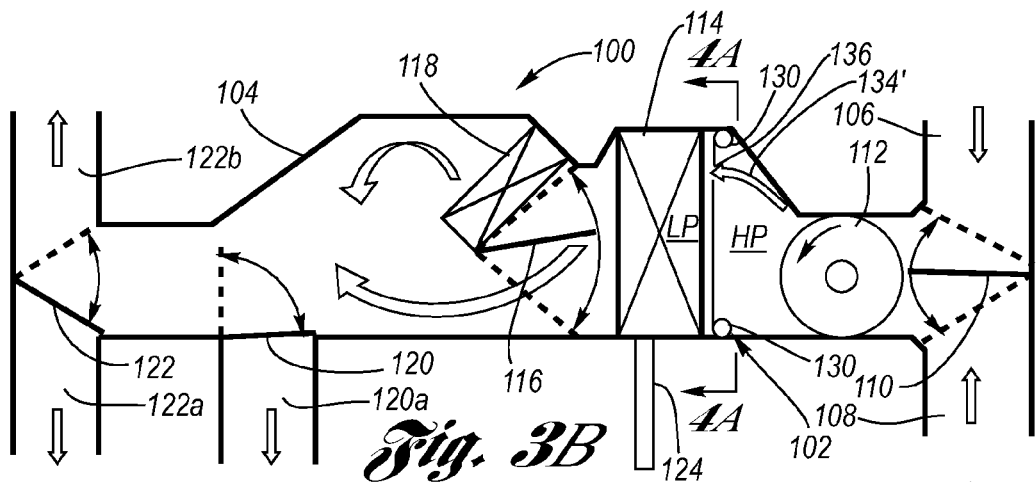
FIG. 3B is a schematic diagram of a motor vehicle HVAC system module, including an evaporator core drying system according to the present invention, wherein now the configurable barrier of the evaporator core drying system is at its slotted configuration.

Referring firstly to FIGS. 3A and 3B, an HVAC module 100 is depicted which includes the evaporator core drying system 102 according to the present invention.

Figure 2:
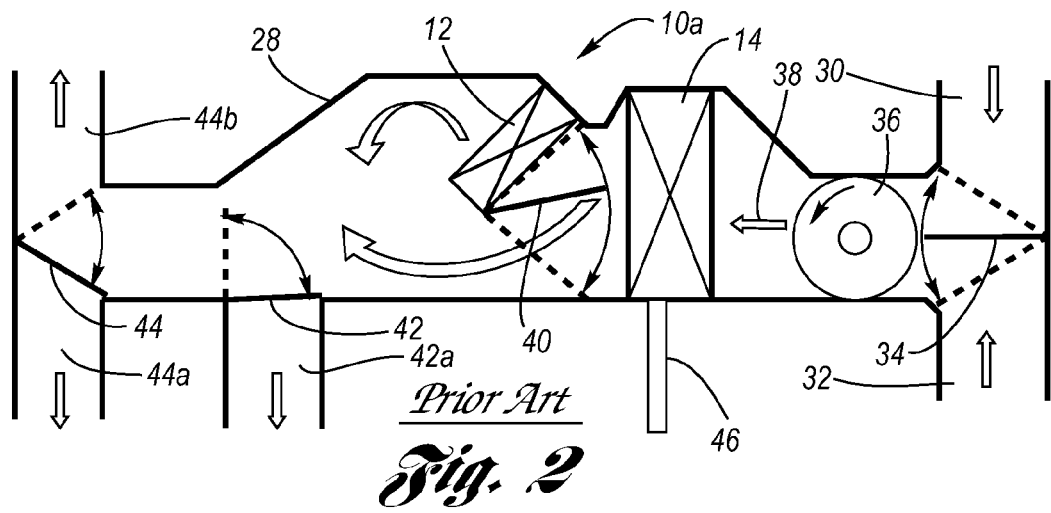
FIG. 2 is a schematic diagram of a motor vehicle HVAC system module according to the prior art.

By way merely of exemplification which follows the description with respect to FIG. 2, the HVAC module 100 is defined by a space enclosing sidewall 104, to which an air input is provided either via a first air-in path 106 which provides air outside the motor vehicle or via a second air-in path 108 which provides air recirculated with respect to the passenger compartment, selection of which of the first and second air-in paths being determined by an air-in door 110. A blower 112 causes air to be drawn in from the first and second air-in paths, and passed as blown air 134 downstream therefrom to an evaporator core 114. A temperature door 116 is positioned to cause the air to pass partly through a heater core 118 or to entirely by-pass it in the event the air conditioning is on maximum. A series of downstream vent doors then direct how the conditioned air passes into the passenger compartment, for example via a floor vent door 120 of a floor vent 120a, and a panel/windshield vent door 122 of a panel vent 122a and a windshield (defroster) vent 122b. Water which accumulates at the evaporator core during operation of the air conditioning drains via a drain tube 124.

The evaporator core drier system 102 includes a configurable barrier 130, which is configurable between a fully open configuration shown at FIG. 3A and a slotted configuration shown at FIG. 3B.

FIG. 3A depicts motor vehicle HVAC system operation during running of the engine in which the HVAC system is generally utilized for conditioning the air entering into the passenger compartment via heating, cooling and ventilation, as desired. In this mode, the HVAC compartment 100 operates in a mode which is unobstructed by the configurable barrier 130 (ie., analogous to a conventional mode of operation), in that the configurable barrier is in its fully open configuration, whereby an opening 132 is formed thereof that has an area generally as large as the area of the evaporator core 130, and thereby allows free passage thereto of the blower air 134.

FIG. 3B depicts motor vehicle HVAC system operation during execution of a blow algorithm (see description below with respect to FIGS. 6A and 6B). It will be seen that the configurable barrier 130 is now reconfigured from the fully open configuration of FIG. 3A into its slotted configuration in which the opening 132 has been reduced to a slot 136. During execution of the blow algorithm, the evaporator core 114 is dried during operation of the blower via a progressively moving air stream 134' of high speed purge air formed of the blower air 134 by the slot 136.

Operationally with respect to drying of the evaporator core 114, the air stream 134' is provided by a difference between a high air pressure region HP and a low air pressure region LP, each on a respective side of the configurable barrier 130, wherein the two differing air pressure regions mutually communicate via the slot 136. According to the blow algorithm, the configurable barrier 130 is thereupon continually reconfigured so that the slot (which retains a constant width) moves progressively across the area of the evaporator core 114, drying progressive portions of the evaporator core as they are progressively exposed to the air stream 134' until the entire evaporator core has been dried.

It should be noted that while the slot 136 as depicted in FIG. 3B is movable progressively in the vertical plane, it is to be understood the slot may be oriented otherwise and move in a direction otherwise (i.e., horizontally or at some arbitrary angle between horizontal and vertical) progressively across the area of the evaporator core from one side of the sidewall 104 to the opposite other side thereof Thereafter, the configurable barrier 130 is reconfigured to again assume its fully open configuration of FIG. 3A (i.e., the slot 136 again becomes the opening 132).

Figure 4A:
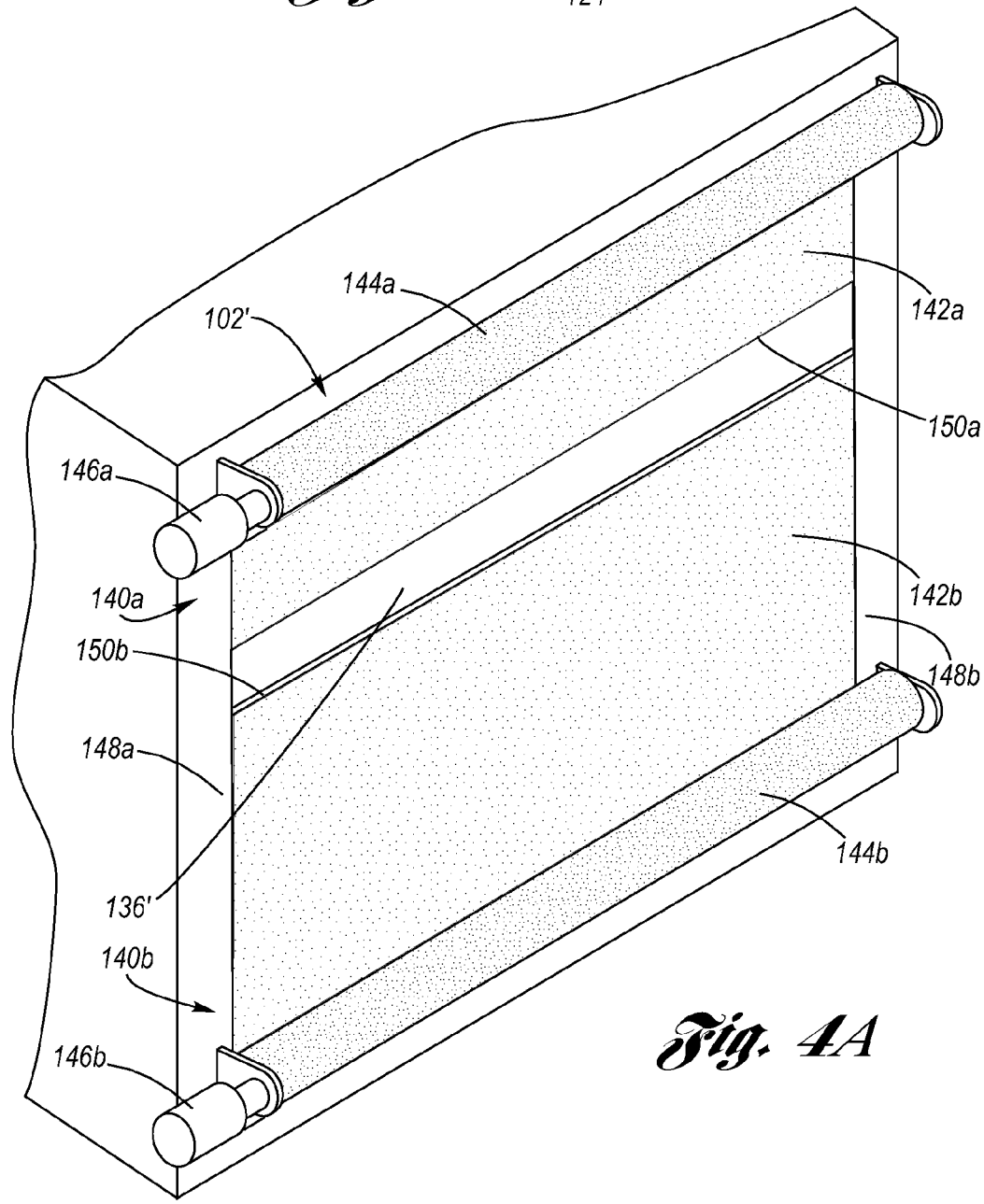
FIG. 4A is a perspective view of a first preferred type of configurable barrier of the evaporator core drying system according to the present invention, seen at line 4A-4A of FIG. 3B, having a pair of separately actuatable roller doors, wherein the roller doors are each in the form of a rollable panel composed of a flexible panel.
Figure 4B:
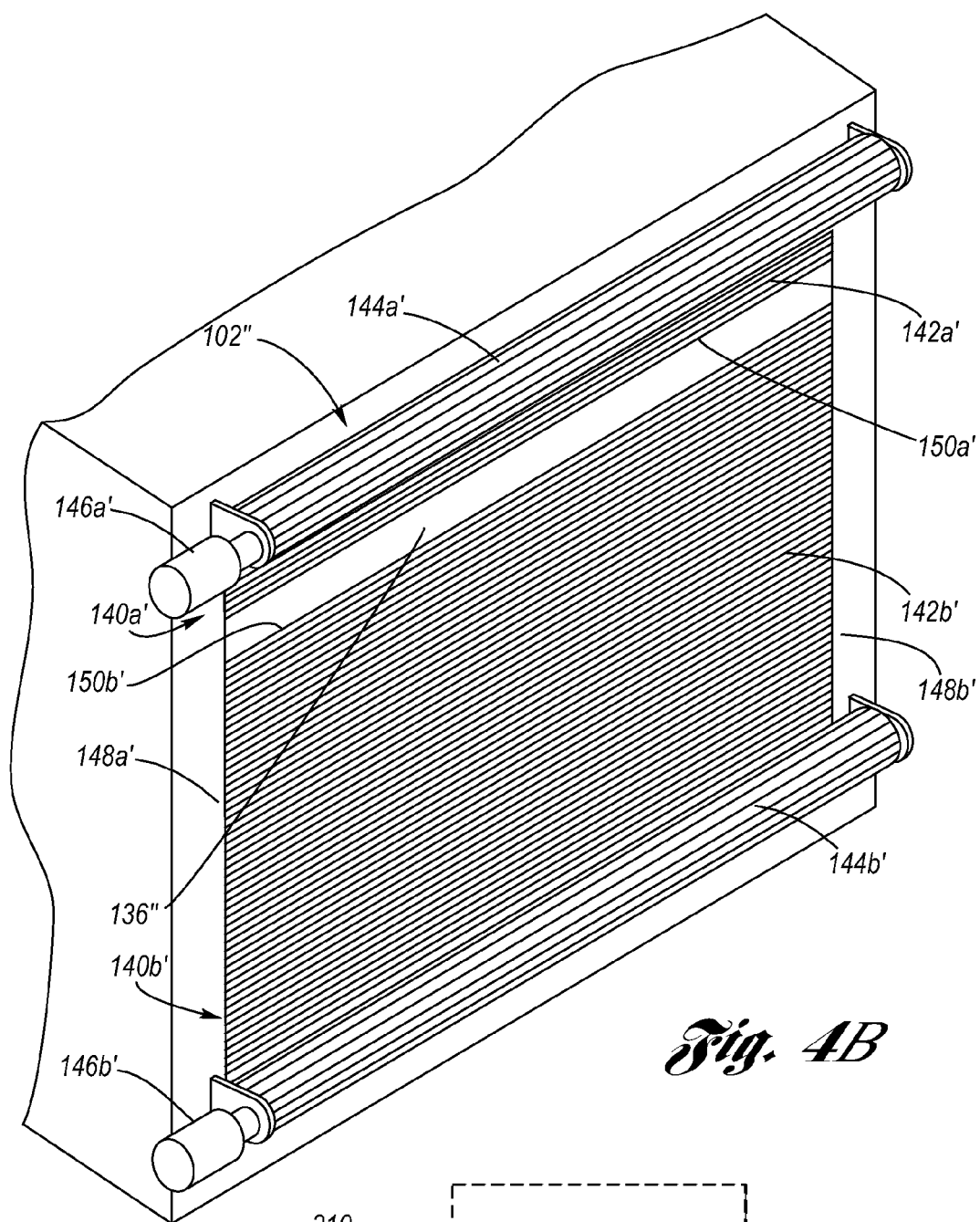
FIG. 4B is a perspective view of the first preferred type of configurable barrier of the evaporator core drying system according to the present invention having a pair of separately actuatable roller doors, wherein now the roller doors are each in the form of a rollable panel composed of a multiplicity of adjacently hinged segments.

Referring now to FIGS. 4A and 4B, a first (most) preferred type of configurable barrier 102', 102" is depicted, composed of a pair of separately actuatable roller doors.

As shown at FIG. 4A, each roller door 140a, 140b is composed of a rollable panel 142a, 142b in the form of a flexible panel, as for example a flexible plastic sheet, each of which being rolled 144*a*, 144*b* upon a respective spool (not visible). Each spool is connected with a respective electric motor 146*a*, 146*b*, as for example a stepper motor, which rolls and unrolls its respective rollable panel 142*a*, 142*b*, wherein the rollable panels are guided by guide channels 148*a*, 148*b* at each side. Each rollable panel 142*a*, 142*b* has a respective leading edge 150*a*, 150*b*, wherein the relative position of the leading edges with respect to each other defines the fully open configuration of the configurable barrier 102' thereby providing the opening (per FIG. 3A), and the slotted configuration thereof providing the shown slot 136' (per FIG. 3B).

Turning attention now to FIG. 4B, the modification to the configurable barrier 102" is that the pair of roller doors 140*a*', 140*b*' is now composed of rollable panels 142*a*', 142*b*' in the form of a foldable panel composed of a multiplicity of segments that are adjacently hinged to each other in a manner well known in the roller door art, wherein like numbers of FIG. 4B with primes represent like functioning parts with respect to the parts of FIG. 4A.

Operation of the evaporator core drying system of FIGS. 3A and 3B will now be detailed with additional reference to FIGS. 5A through 6B.

A blow algorithm 200 of FIG. 6A commences running, typically when the engine is turned off. At execution Block 210 the blower is turned on providing an air stream 134, wherein the configurable barrier 130 is initially in the fully open configuration providing an opening 132 (in the sense of FIG. 4A, the roller doors 140*a*, 140*b* are both rolled up, wherein the leading edges 150*a*, 150*b* are mutually separated sufficiently to thereby provide the opening). This is the ordinary configuration during engine operation.

Next, at execution Block 212, one of the roller doors (the upper one) unrolls to provide the slot 136 of the slotted configuration of the configurable barrier at one side of the evaporator core 114, as depicted at FIG. 5B. At execution Block 214, the roller doors roll/unroll in unison so that the slot retains the same width and progressively moves across the area of the evaporator core 114, as depicted between FIGS. 5B through 5E, whereduring the fast moving air stream 134' through the slot 136 progressively dries the evaporator core. The width of the slot and the rate at which the slot moves is predetermined, in conjunction with the specifications of the blower and the evaporator core, to provide the maximum moisture removal rate yet balancing the vehicle battery state of charge (since the blower is operated by the voltage from the battery) and the overall time allowed for by the blow algorithm logic.

At execution Block 216, the roller doors reconfigure into the fully open position by one of the roller doors rolling down (the lower roller door), as shown between FIGS. 5F and 5A.

Finally, at execution Block 218 the blower is shut-off.

Figure 6B:
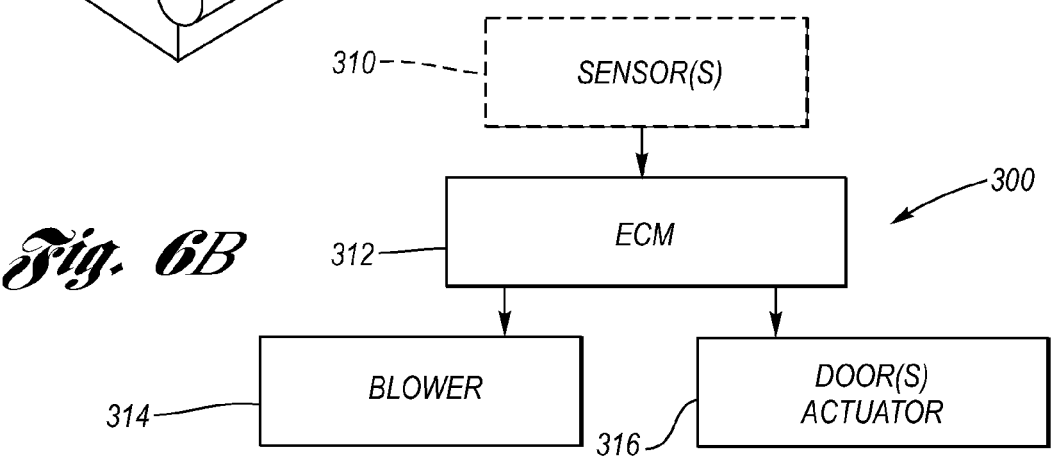
FIG. 6B is a components diagram for implementing the blow algorithm of FIG. 6A.

FIG. 6B is a components schematic 300 for implementing the blow algorithm of FIG. 6A. An electronic control module (ECM) or other computer device at Block 312 is programmed with the blow algorithm 200, and may or may not receive an input from one or more input sensor(s) at Block 310 (in the preferred embodiment, there is no Block 310). The ECM sends commands to the blower at Block 314 and the roller door(s) electric motor(s) at Block 316 to implement the blow algorithm as described above. The rate of movement of the slot progressively across the evaporator core is predetermined according to the blow algorithm, or can be dynamically adjusted at the ECM according to detected moisture, temperature, humidity, etc, from Block 310.

It is to be understood that the configurable barrier may be implemented in any suitable manner. For example, as shown at FIG. 7, depicted is an alternative configurable barrier 102''' composed of a single roller door 160. A single electric motor 146 rolls the door, and a spring 162 biases the return rolling (two electric motors could be used, alternatively). The roller door is constructed of a rollable panel 142, being for example either in the form of a flexible panel or a foldable panel composed of a multiplicity of hinged segments, and is guided by guide channels 148*a*", 148*b*". The rollable panel 142 has a pre-formed slot 136''' and a pre-formed opening 132''', as shown at FIG. 7A. Accordingly, depending upon the extent of the rolling of the rollable panel per rolls 144*a*", 144*b*" on the respective spools, the open configuration or the slotted configuration is provided, and in the case of the slotted configuration, the slot is progressively movable so as to provide the configurations analogous to the depictions of FIGS. 5A through 5F.

It is to be understood, therefore, that the present invention provides hardware and control methodology to: a) optimize the moisture removal rate after engine shuts down; b) eliminate potential for window fogging after the driver starts the engine the next time, since the evaporator core will have minimum (or no) moisture; c) provide a cost effective implementation of a rapid heating technology such as heat pump or hot gas cycles using the evaporator core as the heating device (conventional evaporator cores cannot be used in this manner due to moisture accumulation and the issue with window fogging); and finally, d) obviates need for UV lights.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An evaporator core drying system, comprising:
   a heating, ventilation and air conditioning module comprising:
      an evaporator core; and
      a blower providing a stream of blown air;
   a configurable barrier located between said evaporator core and said blower, wherein said configurable barrier is disposed substantially adjacent said evaporator core such that the stream of blown air blows from said blower through an opening in said configurable barrier and then, after blowing through said opening of said configurable barrier, blows through said evaporator core, said configurable barrier being configurable between a fully open configuration wherein said opening of said configurable barrier has an opening area which is substantially equal to a core area of said evaporator core such that exposure of said evaporator core to the stream of blown air is substantially unlimited by said opening, and a slotted configuration wherein said opening is a slot having a slot area much smaller than said core area which locally limits the area of exposure of said evaporator core to the stream of blown air, wherein the slot area in combination with the stream of blown air provide a high speed purge air through said slot; and
   an electronic circuit connected with said configurable barrier, said electronic circuit implementing a predetermined blow algorithm, said electronic circuit configuring said configurable barrier between said fully open configuration and said slotted configuration responsive to the blow algorithm, said electronic circuit moving said configurable barrier so that said slot progressively moves across substantially the entire core area responsive to the blow algorithm;

wherein the high speed purge air and the progressive movement of said slot provide drying of said evaporator core responsive to the blow algorithm.

2. The system of claim 1, wherein said configurable barrier comprises at least one roller door.

3. The system of claim 2, wherein said at least one roller door comprises:
   at least one selectively rollable panel; and
   at least one actuator for selectively rolling said at least one rollable panel.

4. The system of claim 3, wherein said at least one roller door comprises:
   a pair of roller doors, each roller door having a respective leading edge;
   wherein by varying separation of said leading edges with respect to each other said fully open and said slotted configurations of said configurable barrier are selectively provided.

5. A method for drying an evaporator core of a heating, ventilation, and air conditioning system, comprising the steps of:
   blowing air, the blowing air being blown across substantially the entire area of an evaporator core;
   limiting the area of the blowing air to a predetermined slot area that is much smaller than the entire area of the evaporator core at a location substantially adjacent the evaporator core, wherein the slot area in combination with the blowing air provide an air stream of high speed purge air through the slot that blows upon the evaporator core; moving the slot progressively across substantially the entire area of the evaporator core to thereby provide drying of the evaporator core; and
   unlimiting the area of the blowing air with respect to the entire area of the evaporator core after said step of moving such that the blowing air is again blown across substantially the entire area of the evaporator core;
   wherein said steps are implemented according to a predetermined computer-based blow algorithm.

6. The method of claim 5 wherein said steps of limiting, moving and unlimiting are implemented by selective configuring of a configurable barrier.

7. The method of claim 6, wherein said selective configuring comprises selectively rolling at least one roller door.

8. The method of claim 7, wherein said selective configuring comprises selectively rolling a pair of roller doors.

9. The method of claim 8, wherein:
   said step of selectively rolling comprises:
      rolling at least one roller door with respect to the other roller door to thereby provide a fully open configuration in which substantially the entire area of the evaporator core is exposed to the blowing air; and
      rolling at least one of the roller doors with respect to the other roller door to thereby provide a slotted configuration which defines the slot; and
   said step of moving comprises:
      rolling both rollers doors in unison to progressively move the slot of the slotted configuration progressively across substantially the entire area of the evaporator core.

* * * * *